United States Patent
Lin

(10) Patent No.: US 12,101,808 B2
(45) Date of Patent: Sep. 24, 2024

(54) METHOD AND DEVICES FOR PERFORMING UPLINK TRANSMISSION IN A SHARED DOWNLINK CHANNEL OCCUPANCY TIME

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 277 days.

(21) Appl. No.: 17/691,626

(22) Filed: Mar. 10, 2022

(65) Prior Publication Data

US 2022/0201752 A1 Jun. 23, 2022

Related U.S. Application Data

(63) Continuation of application No. PCT/IB2019/001171, filed on Oct. 6, 2019.

(51) Int. Cl.
*H04W 74/0808* (2024.01)
*H04L 5/00* (2006.01)

(52) U.S. Cl.
CPC ....... *H04W 74/0808* (2013.01); *H04L 5/0048* (2013.01)

(58) Field of Classification Search
CPC .... H04W 74/08; H04W 74/0816; H04L 5/00; H04L 5/0048
See application file for complete search history.

(56) References Cited

U.S. PATENT DOCUMENTS

2017/0150524 A1* 5/2017 Oh .................. H04W 74/0808
2019/0159253 A1 5/2019 Koorapaty et al.

FOREIGN PATENT DOCUMENTS

CN 107318171 A 11/2017
CN 108289331 A 7/2018
(Continued)

OTHER PUBLICATIONS

The first Office Action of corresponding Indian application No. 202217013095 dated on Jul. 18, 2022.
(Continued)

*Primary Examiner* — Sulaiman Nooristany
(74) *Attorney, Agent, or Firm* — Ladas & Parry LLP

(57) ABSTRACT

A method for performing uplink transmission by a user equipment within a downlink channel occupancy time shared by a base station. The method includes obtaining a first indication about an uplink transmission starting point allocated by the base station; obtaining a second indication about a channel sensing type to apply; obtaining a third indication about a channel sensing position selected by the base station amongst one or more candidate positions; applying channel sensing based on said second and third indications during a channel sensing duration; initiating uplink transmission after the channel sensing duration, if allowed, in advance to the allocated starting point by: a first time duration which compensate for the propagation time, and a second time duration which fills at least part of the time gap between the end of the channel sensing duration and the beginning of the first time duration.

9 Claims, 5 Drawing Sheets

(56) References Cited

FOREIGN PATENT DOCUMENTS

| | | |
|---|---|---|
| WO | 2017126946 A1 | 7/2017 |
| WO | 2017171603 A1 | 10/2017 |
| WO | 2019035624 A1 | 2/2019 |
| WO | 2019154357 A1 | 8/2019 |

OTHER PUBLICATIONS

The first Office Action of corresponding European application No. 19818245.3, dated Jun. 29, 2023.
International Search Report (ISR) dated Jun. 16, 2020 for Application No. PCT/IB2019/001171.
Vivo, Discussion on physical UL channel design in unlicensed spectrum, R1-1812299, 3GPP TSG RAN WG1 Meeting #95, Spokane, US, Nov. 12-16, 2018.
The first Office Action of corresponding Chinese application No. 202210586243.2, dated May 11, 2024.
The second Office Action of corresponding Chinese application No. 202210586243.2, dated Jul. 16, 2024.

* cited by examiner

METHOD AND DEVICES FOR PERFORMING UPLINK TRANSMISSION IN A SHARED DOWNLINK CHANNEL OCCUPANCY TIME

CROSS-REFERENCE TO RELATED APPLICATION

This application is a continuation of International Application No. PCT/IB2019/001171, filed on Oct. 6, 2019, the disclosure of which is hereby incorporated by reference in its entirety.

TECHNICAL FIELD

The present disclosure relates to a method and devices for performing uplink transmission in a shared downlink channel occupancy time.

The present disclosure is for example applicable to a telecommunication system such as a 5G (fifth generation) network using the 5G NR (New Radio) as radio access technology (RAT) defined by 3GPP. In particular it is applicable to 5G NR-U (NR in the unlicensed spectrum).

BACKGROUND

The unlicensed spectrum is a spectrum shared by different communication systems. A communication equipment in a communication system can use the unlicensed spectrum without authorization from the government as long as it meets the regulatory requirements set by the country or region with respect to the use of unlicensed spectrum.

In order to allow various communication systems that use the unlicensed spectrum for wireless communication to coexist friendly in the spectrum, some countries or regions specify regulatory requirements that must be met to use the unlicensed spectrum. For example, the communication equipment shall perform channel sensing before transmitting on the channel. An exemplary embodiment of a channel sensing procedure is known as Listen Before Talk (LBT). During the LBT the communication equipment may be requested to perform an energy measurement on the channel to determine if the channel is idle. If the energy measurement shows that the channel is not idle, the communication equipment is not allowed to initiate signal transmission. Otherwise the communication equipment can initiate signal transmission. In order to ensure fairness, once a communication equipment successfully occupies the channel, the transmission duration cannot exceed the Maximum Channel Occupancy Time (MCOT).

On the unlicensed carrier, a base station can decide to share its channel occupancy time with a user equipment for the user equipment to transmit ran uplink signal. Advantageously the downlink channel occupancy time can be used by the user equipment to apply a channel sensing procedure. This allows the user equipment to obtain the channel more quickly.

For example, the recent agreement RAN1 #95 of the on-going NR-U discussion specifies that the user equipment can perform a LBT procedure of Category 1 or Category 2 by using the base station channel occupancy time.

One object of this disclosure is to propose a method and devices to enable a user equipment to perform uplink transmission in the shared downlink channel occupancy time.

Another object of this disclosure is to propose a method and devices for performing a channel sensing procedure at the user equipment by using the shared downlink channel occupancy time.

Another object of this disclosure is to propose implementations for performing a LBT procedure in the shared downlink channel occupancy time.

SUMMARY

The scope of protection sought for various embodiments of the present disclosure is set out by the independent claims. The various embodiments/examples, aspects and features, if any, described in this specification that do not fall under the scope of the independent claims are to be interpreted as examples useful for understanding various embodiments of the present disclosure.

According to a first aspect, there is provided a method for performing uplink transmission by a user equipment within a downlink channel occupancy time shared by a base station, where the transmission between the base station and the user equipment is affected by a propagation time. The method comprises obtaining a first indication about an uplink transmission starting point allocated by the base station: obtaining a second indication about a channel sensing type to apply to be allowed to initiate the uplink transmission; obtaining a third indication about a channel sensing position selected by the base station amongst one or more candidate positions; applying channel sensing based on said second and third indications during a channel sensing duration, initiating uplink transmission after the channel sensing duration, if allowed, in advance to the allocated starting point by: a first time duration which compensate for the propagation time, and, if there is a time gap between the end of the channel sensing duration and the beginning of the first time duration, a second time duration which fills at least part of the time gap.

In an embodiment, the channel sensing position is a channel sensing starting point. In an alternative embodiment the channel sensing position is a channel sensing ending point.

In an embodiment, the second indication comprises the channel sensing duration.

In an embodiment the base station makes a selection amongst more than one channel sensing candidate positions which are separated by a fixed time spacing, and the user equipment obtains from the base station an indication about the number of channel sensing candidate positions and the time spacing.

In an embodiment, when the method is used in a radio network implementing an Extended Timing Advance mechanism, the second duration is filled by using the Extended Timing Advance mechanism. In an alternative embodiment the second duration is filled by adding redundancy to the uplink signal. For example, when the method is used in a radio network implementing an Extended Cyclic Prefix mechanism, the second duration is tilled by using the Extended Cyclic Prefix mechanism.

The embodiments described above can be combined in various ways.

According to a second aspect, there is provided a device comprising means for performing a method according to the first aspect. The means may comprise circuitry, transmitter and receiver for obtaining indications, performing channel sensing, and transmitting uplink signal to a base station. For example, the means comprise at least a processor and at least a memory including a computer program code, wherein the memory and computer program code are configured to, with the processor, cause the device to perform one or more steps of the method. The device may comprise several processors and several memories.

According to a third aspect, there is provided a user equipment comprising a device according to the second aspect.

According to fourth aspect, there is provided a computer readable medium comprising program instructions stored thereon for causing a device to perform the steps of the method according to the first aspect. The computer readable medium may be a non-transitory computer readable medium.

According to a fifth aspect, there is provided a method for sharing downlink channel occupancy time for uplink transmission. The method comprises allocating an uplink transmission starting point and providing a first indication about the uplink transmission starting point to a user equipment, providing a second indication about a channel sensing type to be applied by the user equipment prior to initiating the uplink transmission; selecting a channel sensing position amongst one or more candidate positions and providing a third indication about the selected channel sensing position to the user equipment.

In an embodiment of the fifth aspect, the base station makes a selection amongst more than one channel sensing candidate positions which are separated by a fixed time spacing, and provides the user equipment with an indication about the number of channel sensing candidate positions and the time spacing.

In another aspect, there is provided a device comprising means for performing a method according to the fifth aspect. The means may comprise circuitry and transceiver for providing indications to the user equipment. For example the means comprise at least a processor and at least a memory including a computer program code, wherein the memory and computer program code are configured to, with the processor, cause the device to perform one or more steps of the method according to the fifth aspect, The device may comprise several processors and several memories.

According to another aspect, there is provided a base station comprising a device according to the fifth aspect.

According to another aspect, there is provided a computer readable medium comprising program instructions stored thereon for causing a device to perform the steps of the method according to the fifth aspect. The computer readable medium may be a non-transitory computer readable medium.

The present disclosure may find application in radio network with unlicensed spectrum (also referred to as NR-U in the context of the 3GPP standard). More generally, the present disclosure may find application in any other radio network in which a user equipment performs channel sensing prior to initiating uplink communication.

BRIEF DESCRIPTION OF DRAWINGS

Some embodiments are now described, by way of example only, and with reference to the drawings, in which.

DESCRIPTION OF EMBODIMENTS

Example embodiments will be described below with reference to functions, block diagrams, flow diagrams, time diagrams and/or flowcharts illustrating methods, apparatuses, systems, computer programs, computer readable mediums according to one or more exemplary embodiments. It will be appreciated by the man skilled in the art that the time diagrams are schematics intended to depict the principles of the exemplary embodiments. The time diagrams are not to scale. In particular, the respective size of the various blocks in the time diagrams are not representative of respective time durations.

Figure 1:
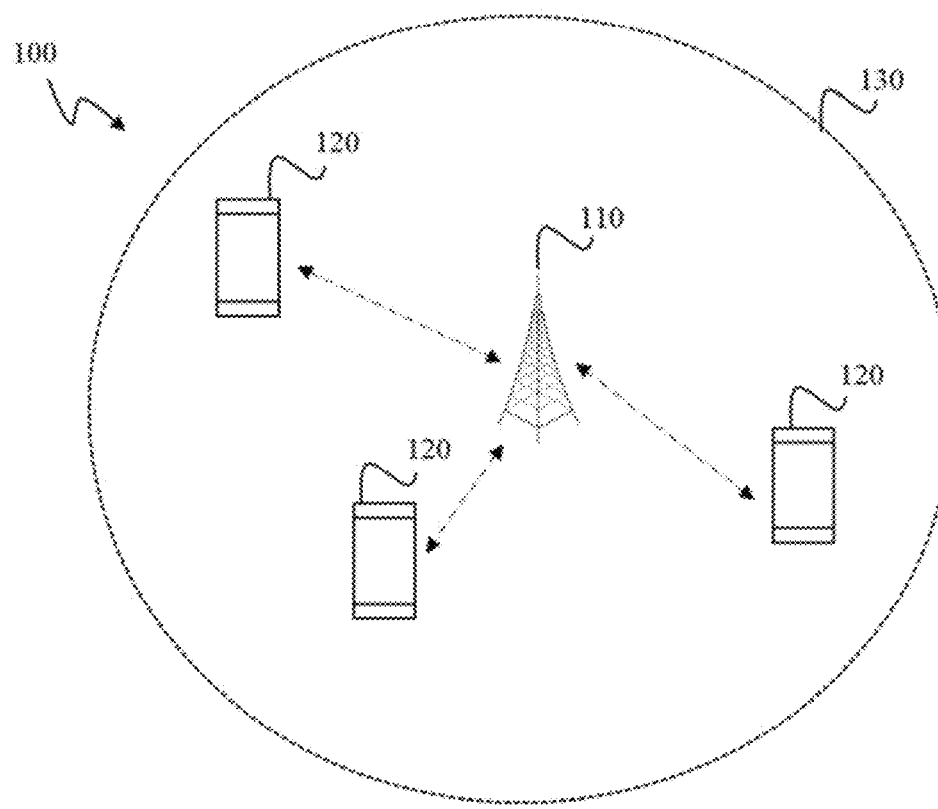
FIG. 1 represents schematically a communication system in which one or more disclosed embodiments may be implemented.

FIG. 1 depicts a system 100, in accordance with some example embodiments. The system 100 includes a base station 110 and one or more user equipment 120 within the radio cell coverage 130 of the base station 111. In this example, the base station 110 may be configured in accordance with 5G (having for example an NR, new radio, air interface) or LTE. Although some of the examples herein refer to certain types of base stations, such as 5G and LTE base stations, other types of base stations, including femtocell base stations, home eNB base station, picocell base station, small cell base stations, and/or other radio access points may be used as well. Moreover, although some of the examples herein refer to certain types radio access technologies, such as 5G, NR, and LTE, other types of radio technologies may be used as well. The embodiments are not restricted to the 3GPP network that is given herein as an example, but a person skilled in the art may apply the solution to other communication system.

In order to allow various communication systems that use the unlicensed spectrum for wireless communication to coexist friendly in the spectrum, some countries or regions specify regulatory requirements that must be met to use unlicensed spectrum. For example, the communication equipment shall perform channel sensing before transmitting on the channel.

To schedule uplink transmission, the base station provides the user equipment with information required to initiate the uplink transmission, including a first indication about an uplink transmission starting point allocated by the base station. This first indication is included in the DCI (Downlink Control Information) signal defined in the 3GPP specifications.

Assuming that the base station wants to share its downlink channel occupancy time, it has to create a downlink gap P between the end of the transmission of the downlink signal and the uplink allocated starting point. This downlink gap P shall be used by the user equipment to apply the channel sensing procedure.

Figure 2:
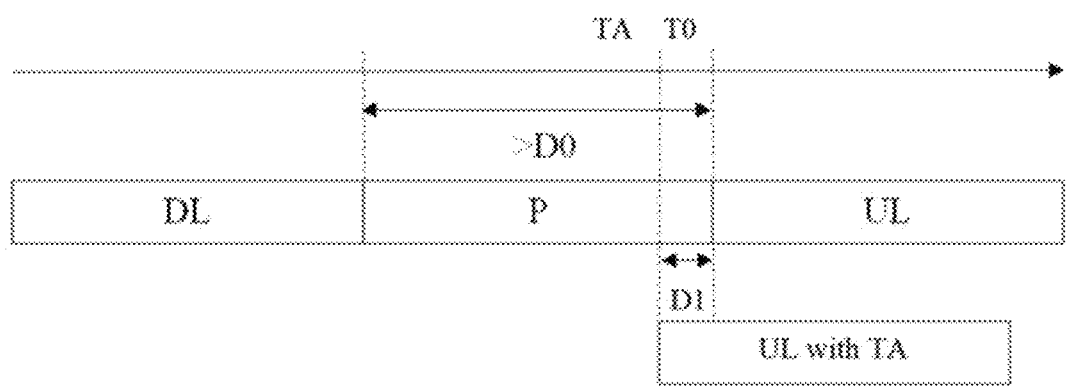
FIG. 2, FIG. 3A, FIG. 3B, FIG. 4A.

FIG. 2 depicts an example where the base station has created a downlink gap P between the end of the transmission of the downlink signal DL and the uplink allocated starting point T0. In FIG. 2 the horizontal axis is the time axis. The block referred to as DL represents the last downlink OFDM symbol and the block referred to as UL represents the first uplink OFDM symbol with the symbol boundaries at the user equipment side.

In a 5G network, the channel sensing procedure is known as Listen Before Talk (LBT). Three types of procedures are currently available. These 3 types are called LBT categories and include: category 1, category 2 and category 4. The recent agreement RAN1 #95 of the on-going NR-U discussion specifies that the user equipment can perform a LBT procedure of category 1 or category 2 by using the base station channel occupancy time (COT). For this reason the remaining of the description will focus on category 1 and category 2 LBT. However this is not limitative.

When category 1 LBT applies the user equipment shall not perform any energy measurement on the channel prior to establishing uplink transmission. It shall wait for the duration of the LBT and is allowed to transmit at the end of the LBT duration. In this exemplary embodiment the LBT duration is set to 16 μs. In the figures the duration of the LBT is referred to as D0.

When Category 2 LBT applies, the user equipment shall perform an energy measurement and is allowed to start uplink transmission at the end of the LBT duration only if the energy measurement is below a certain threshold. In this exemplary embodiment, two LBT durations are available: either 16 μs or 25 μs.

As depicted in FIG. 2, for the user equipment to apply the LBT procedure, the base station must create a downlink gap P which is higher than the LBT duration D0.

Figure 3A:
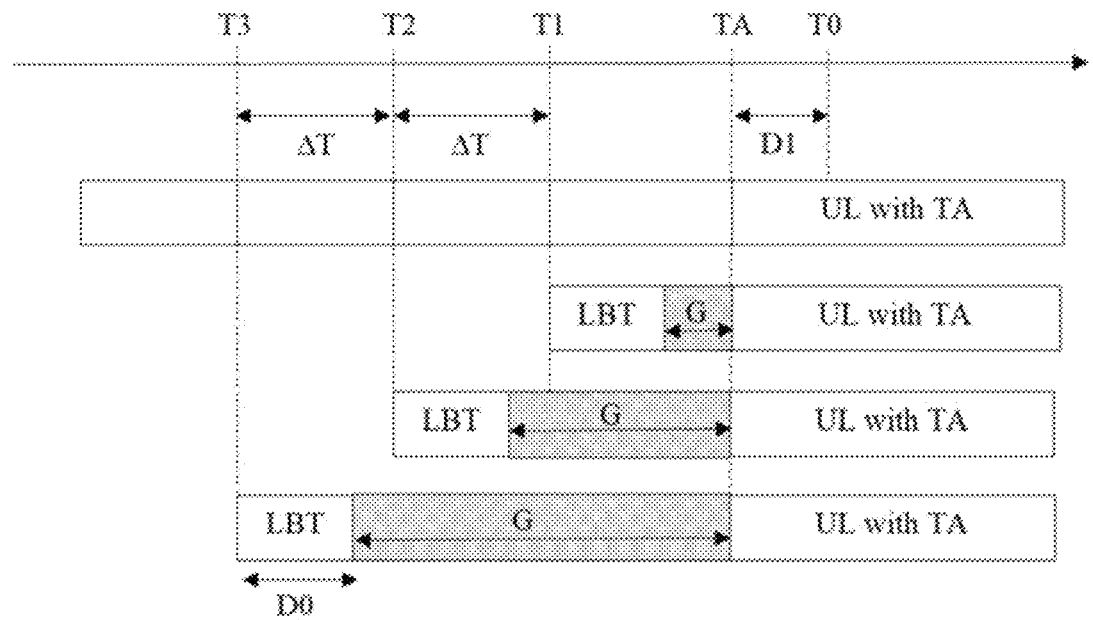
Figure 3B:
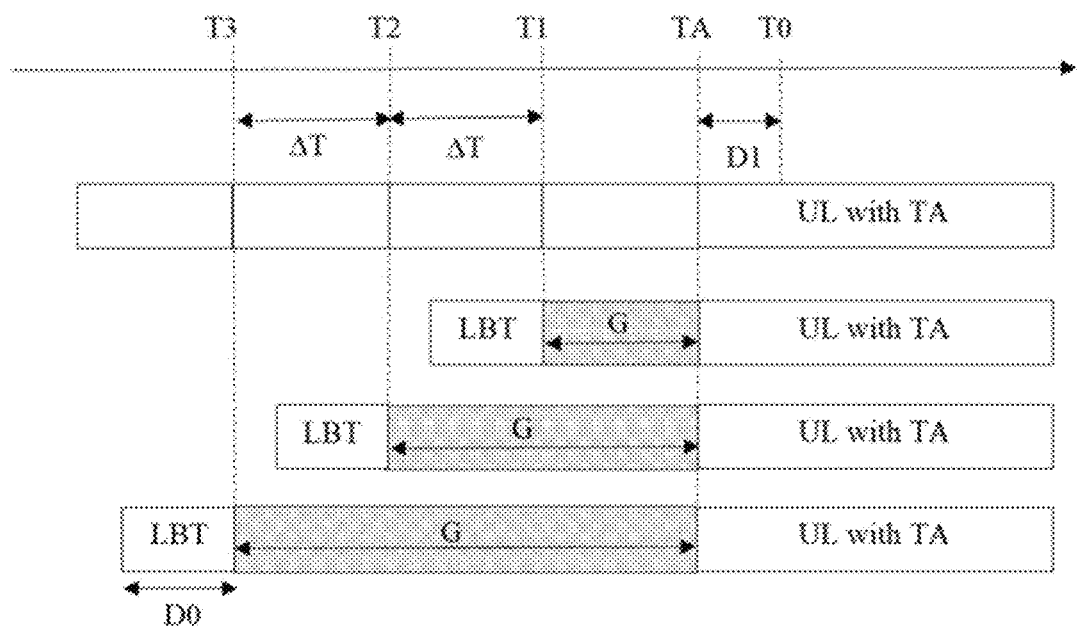

Advantageously the base station selects a LBT position amongst a plurality of LBT candidate positions within the downlink gap P. In the following description m is the number of LBT candidate positions and $\Delta T$ is a fixed time interval between 2 consecutive LBT candidate positions. In FIGS. 3A and 3B an example is depicted with m=3.

When the user equipment wants to connect to the network, it goes through an initial access procedure which includes a synchronization, a RACH process (Random Access Channel) and a RRC configuration (Radio Resource Control). The number m of LBT candidate positions and the time interval $\Delta T$ between 2 consecutive LBT candidate positions are either pre-defined in the specification or sent to the user equipment as part of the RRC message during the RRC configuration/reconfiguration procedure.

In a first exemplary embodiment depicted in FIG. 3A the LBT position is a starting point. In this first embodiment the user equipment starts the LBT procedure at the LBT position obtained by the user equipment (either T1 or T2 or T3 in this example). In a second exemplary embodiment depicted in FIG. 3B the LBT position is an ending point. In this second embodiment the user equipment ends the LBT procedure at the LBT position obtained by the user equipment (either T1 or T2 or T3 in this example). Note that T3 is before T2 which is before T1.

In order to be able to apply the LBT procedure the user equipment needs to obtain indications about the type and the position of the LBT.

In an embodiment, the user equipment obtains a second indication about the LBT type, for example an indication about the LBT category (category 1 or category 2) and the LBT duration (16 μs or 25 μs), and a third indication about the LBT position, for example the time position Ti (with i=1 to m) of the starting or the ending point of the LBT.

The second and third indications are transmitted in the DCI signal with the first indication about the uplink transmission starting point T0.

In order to compensate for the propagation time between the base station and the user equipment, the user equipment should start the uplink transmission ahead of the allocated uplink starting point T0 by a first duration D1. This mechanism is known as Timing Advance (TA) in the 3GPP specifications.

As depicted in FIGS. 3A and 3B, there may be a remaining gap G between the end of the LBT procedure at Ti+D0 and the time position TA=T0−D1 (uplink signal with regular timing advance).

Some regulatory requirements that specify the conditions of use of the unlicensed spectrum provide that the actual uplink starting point shall not be positioned 16 μs or 25 μs later than the downlink transmission if the user equipment wants to perform LBT category 1 or 2.

To fulfill this requirement the uplink transmission is further advanced by a second duration D2 so that it actually starts at T0−D1−D2.

In a first embodiment an Extended Timing Advance mechanism (ETA) as specified in the 3GPP specification is used to fill the remaining gap G. This first embodiment is depicted in FIG. 4A.

In a second embodiment the remaining gap G is filled by adding redundancy in front of the first uplink OFDM symbol. For example the redundancy is obtained by duplicating from a certain sample up to the last sample of the first uplink OFOM symbol in time domain. For example this is achieved by implementing the Extended Cyclic Prefix (FCP) mechanism of the 3GPP specifications. This second embodiment is depicted in FIG. 4B.

In some cases where the regulation requirement allows that the actual transmission does not start right after the end to the LBT, it is not necessary to fill the complete remaining gap G. It may be sufficient to fill part of the remaining gap G. In some instances, the remaining gap may not need to be filled at all.

Figure 4A:
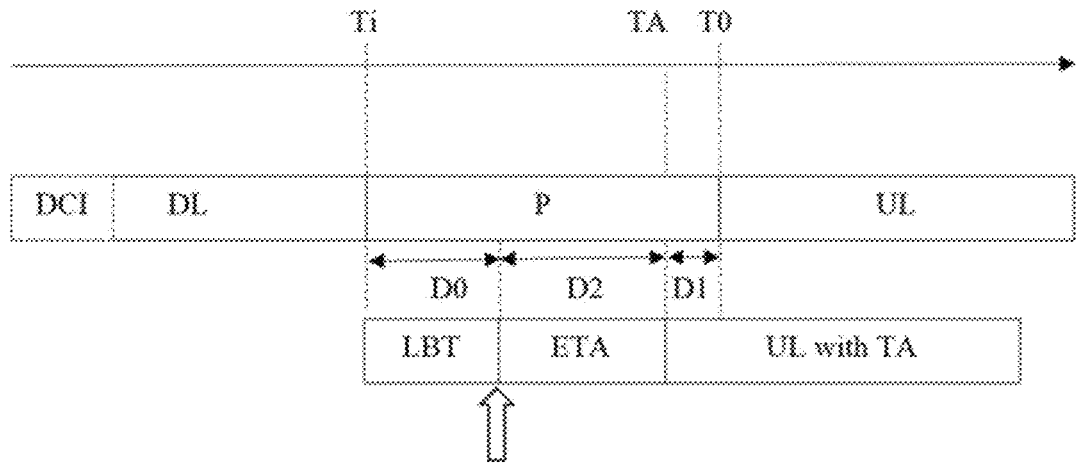
Figure 4B:
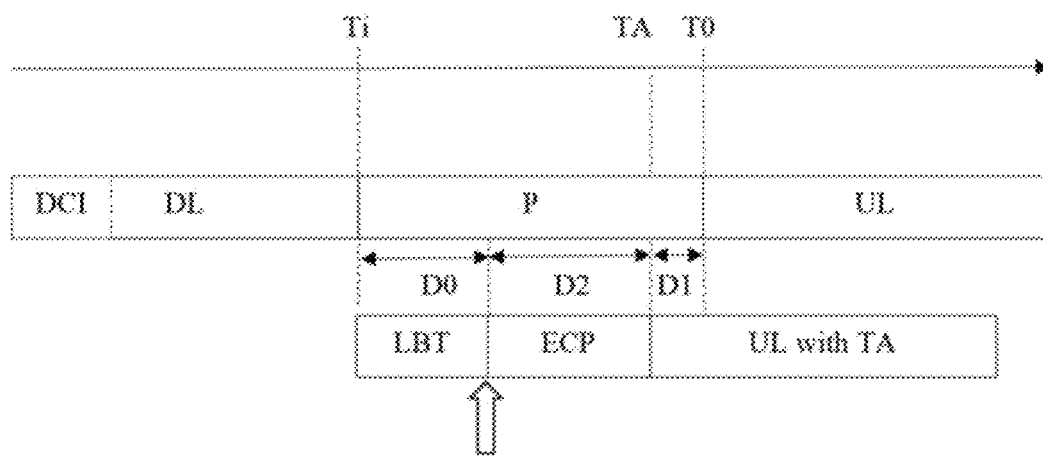
FIG. 4B and FIG. 5 are time diagrams showing aspects of a channel sensing and uplink transmission process according to various embodiments.
Figure 5:
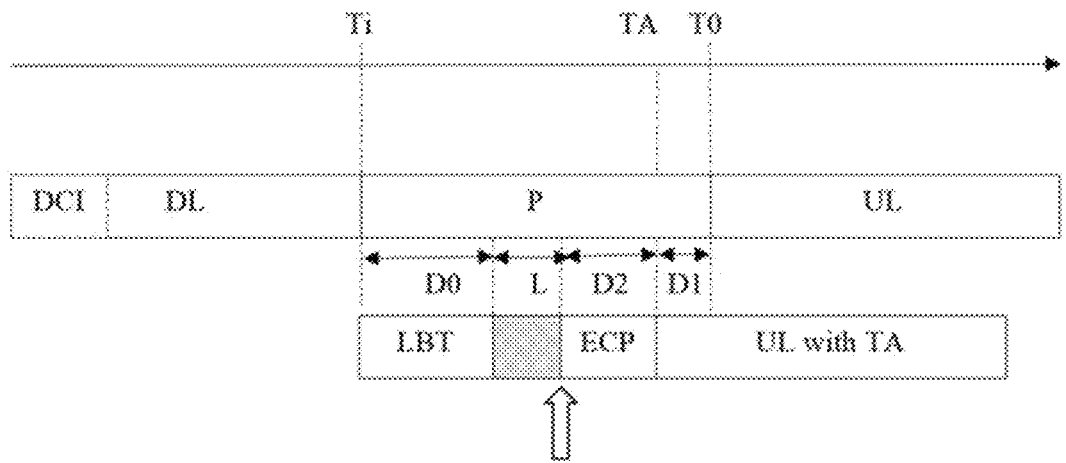

In the examples depicted in FIGS. 4A and 4B the remaining gap G is completely filled. In the example depicted in FIG. 5 a final gap remains L=P−D0−D1−D2.

Figure 6:
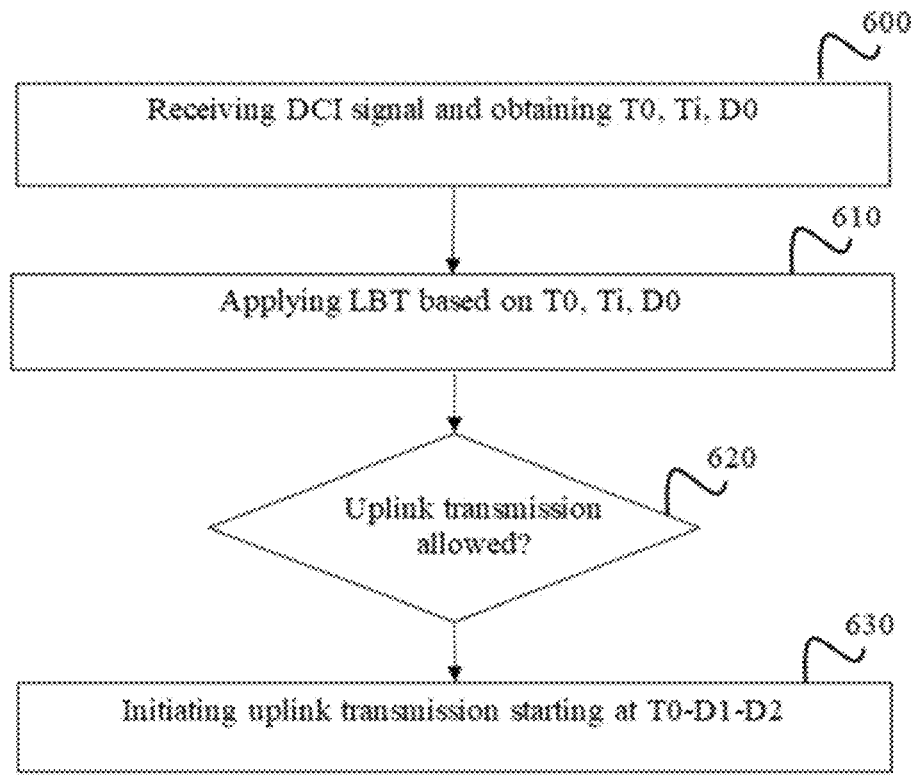
FIG. 6 is a flowchart of an example implementation of a method for performing uplink transmission in a shared downlink channel occupancy time.

FIG. 6 is a flowchart of an example of a method for performing uplink transmission in a shared downlink channel occupancy time.

The steps of the method may be implemented by a device in a user equipment according to any example described herein. The user equipment is served by a base station in a radio network.

While the steps are described in a sequential manner, the man skilled in the art will appreciate that some steps may be omitted, combined, performed in different order and/or in parallel.

In step 600, the user equipment receives from the base station a DCI signal which includes:
- a first indication about an uplink transmission starting point allocated by the base station (T0);
- a second indication about a channel sensing type to apply to be allowed to initiate the uplink transmission (for example LBT category and duration);
- a third indication about a channel sensing position selected by the base station amongst one or more candidate positions (for example T1).

In step 610, the user equipment applies the LBT procedure based on the indication received. The LBT procedure terminates at Ti+D0 if Ti is the LBT starting point and ends at Ti if Ti is the LBT ending point.

In step 620 the user equipment decides based on the outcome of the channel sensing procedure if it is allowed to initiate uplink transmission. When the user equipment is allowed to initiate the uplink transmission, it proceeds with step 630.

In step 630 the user equipment initiates the uplink transmission at T0−D1−D2 where D1 is determined to compensate for the channel propagation time (D1=T0−TA) and D2 is determined to fill at least part of the remaining gap G between the time position TA=T0−D1 and the end of the LBT procedure (D2=P−D0−D1−L where L can be equal to zero).

Figure 7:
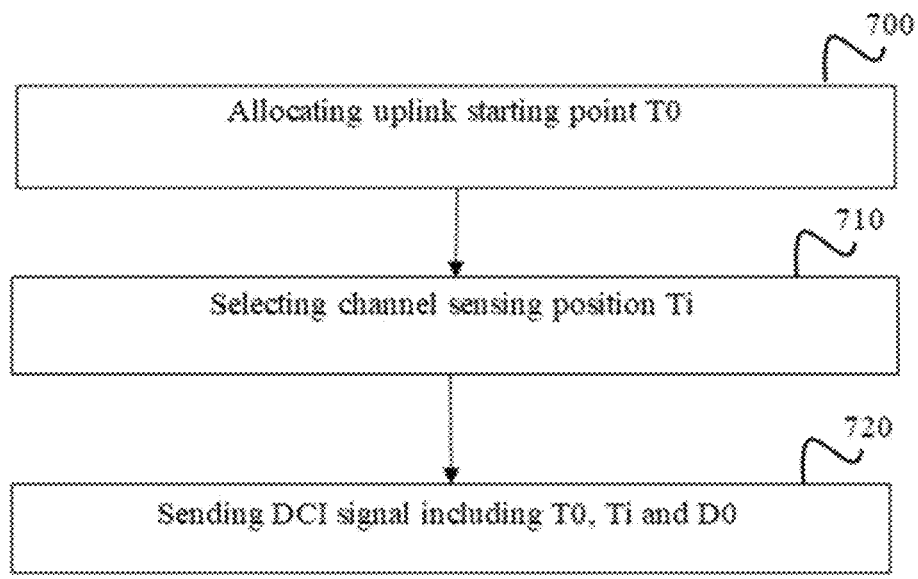
FIG. 7 is a flowchart of an example implementation of a method for sharing a downlink channel occupancy time for uplink transmission.

FIG. 7 is a flow chart of an example of a method for sharing a downlink channel occupancy time for uplink transmission.

The steps of the method may be implemented by a device in a base station according to any example described herein. A user equipment is served by the base station in a radio network.

While the steps are described in a sequential manner, the man skilled in the art will appreciate that some steps may be omitted, combined, performed in different order and/or in parallel.

In step 700, the base station allocates an uplink transmission starting point.

In step 710, the base station selects a channel sensing position Ti (for example T1) amongst one or more candidate positions (T1, . . . , Ti, . . . Tm).

In step 720 the base station sends a DCI signal to the user equipment. The DCI signal includes:
- a first indication about the allocated uplink transmission starting point (T0);
- a second indication about a channel sensing type to be applied by the user equipment prior to initiating the uplink transmission (for example LBT category and duration);
- a third indication about the selected channel sensing position Ti.

It should be appreciated by the man skilled in the art that an functions, engines, block diagrams, flow diagrams, state transition diagrams and/or flowcharts herein represent conceptual views of illustrative circuitry embodying the principles of the present disclosure. Similarly, it will be appreciated that any flow charts, flow diagrams, state transition diagrams, pseudo code, and the like represent various processes which may be substantially represented in computer readable medium and so executed by a computer or processing apparatus, whether or not such computer or processor is explicitly shown.

Each described function, engine, block, step can be implemented in hardware, software, firmware, middleware, microcode, or any suitable combination thereof. If implemented in software, the functions, engines, blocks of the block diagrams and/or flowchart illustrations can be implemented by computer program instructions/software code, which may be stored or transmitted over a computer-readable medium, or loaded onto a general purpose computer, special purpose computer or other programmable processing apparatus and/or system to produce a machine, such that the computer program instructions or software code which execute on the computer or other programmable processing apparatus, create the means for implementing the functions described herein.

Implementations of the various techniques and methods described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium.

In the following, "means configured to perform . . . " a function shall be understood as functional block(s) comprising circuitry that is adapted for performing or configured to perform the function. Moreover, any entity described herein as "means", may correspond to or be implemented as "one or more modules", "one or more devices", "one or more units", etc. Means for performing one or more functions may also comprises at least processor and at least one memory (e.g. in a system or apparatus) for storing computer program code configured to, with the at least one processor, cause the performance (by a system or corresponding device) of the one or more functions.

When provided by a processor, the functions may be provided by a single dedicated processor, by a single shared processor, or by a plurality of individual processors, some of which may be shared. The functions of the various elements shown in the figures, including any functional blocks labeled as "processors", may be provided through the use of dedicated hardware as well as hardware capable of executing software in association with appropriate software.

Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

The term "circuitry" may refer to hardware-only circuit implementations; combinations of circuits and software and/or firmware; or hardware circuit(s) and/or processor(s), such as a microprocessors or a portion of a microprocessor(s), that require or not software and/or firmware for operation, whether the software or firmware is or not physically present. A circuitry may be a general purpose circuitry or a special purpose logic circuitry, e.g., an FPGA (field programmable gate array) or an ASIC (application-specific integrated circuit). The term circuitry also covers, for example and if applicable to the particular claimed element, a baseband integrated circuit, processor integrated circuit or a similar integrated circuit for a base station and/or user equipment.

Some embodiments are also intended to cover computer-readable medium, e.g., digital data storage media, which are machine or computer readable and encode machine-executable or computer-executable programs of instructions, wherein such instructions are configured to cause the execution of some or all of the steps of said above-described methods by a corresponding apparatus, device or system. The computer-readable medium may be, e.g., digital memories, magnetic storage media such as a magnetic disks and magnetic tapes, hard drives, or optically readable digital data storage media.

Embodiments of a computer-readable medium includes, but are not limited to, both computer storage media and communication media including any medium that facilitates transfer of a computer program from one place to another.

Specifically, program instructions or computer readable program code to perform embodiments described herein may be stored, temporarily or permanently, in whole or in part, on a non-transitory computer readable medium of a local or remote storage device including one or more storage media.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carder signal, telecommunications signal, and software distribution package, for example. Depending on the processing power needed, the computer program may be executed in a single electronic digital computer or it may be distributed amongst a number of computers.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Figure 8:
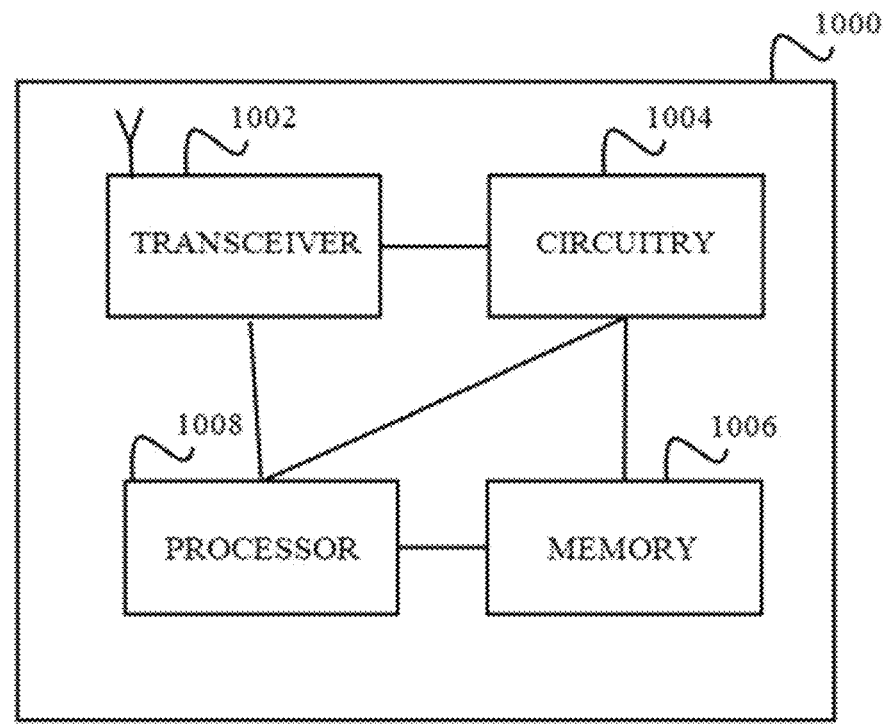
FIG. 8 is a block diagram of a device according to an example implementation.

For completeness, FIG. 8 shows an example block diagram of a device (e.g. user equipment or a base station) 1000 according to an implementation. The device 1000 may include, for example, one or more radio transceivers 1002, where each radio transceiver includes a transmitter to transmit radio signals and a receiver to receive radio signals. The device 1000 also includes a circuitry 1004 (e.g. a processor, control unit/entity, controller) to execute instructions or software and control transmission and receptions of signals, and a memory 1006 to store data and/or instructions. The circuitry 1004 may control the radio transceiver 1002 to receive, send, broadcast or transmit signals and/or data. When the circuitry 1004 is implemented in a user equipment, it is configured to process DCI signal and perform any of the processing steps described herein. When the circuitry 1004 is implemented in a base station, it is configure to allocate the uplink starting point T0, select the channel sensing position (for example T1) and perform any of the steps described herein.

The circuitry 1004 may also make decisions or determinations, generate frames, packets or messages for transmission, decode received frames or messages for further processing, and other tasks or functions described herein. The circuitry 1004, which may be a baseband processor, for example, may generate messages, packets, frames or other signals for transmission via radio transceiver 1002. The circuitry 1004 may control transmission of signals or messages over a radio network, and may control the reception of signals or messages, etc., via a radio network (e.g., after being down-converted by radio transceiver 1002, for example). The circuitry 1004 may be programmable and capable of executing software or other instructions stored in memory or on other computer media to perform the various tasks and functions described above, such as one or more of the tasks or methods described above. The circuitry 1004 may be or include, for example, hardware, programmable logic, a programmable processor that executes software or firmware, and/or any combination of these. Using other terminology, the circuitry 1004 and transceiver 1002 together may be considered as a radio transmitter/receiver system, for example.

In addition, a processor 1008 may execute software and instructions, and may provide overall control for the device 1000, and may provide control for other systems not shown in FIG. 8 such as controlling input/output devices and/or may execute software for one or more applications that may be provided on device 1000.

In addition, a computer-readable storage medium may be provided that includes stored instructions, which when executed by the processor 1008 performs one or more of the functions, steps or tasks described above for the concerned device.

For example, the device 1000 also may include, or be operatively coupled to receive data from or transfer data to, or both, one or more computer-readable storage mediums, e.g., magnetic, magneto-optical disks, or optical disks. A computer-readable storage medium suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

The processor 1008 may be configured to store, read, load and/or otherwise process computer program code stored in a computer-readable storage medium and/or in the memory 1006 that, when executed by the at least one processor, causes the device 1000 to perform one or more steps of a method described herein for the concerned device 1000. Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data.

The processor 1008 may be any suitable microprocessor, microcontroller, integrated circuit, or central processing unit (CPU) including at least one hardware-based processor or processing core.

The memory 1006 may include a random access memory (RAM), cache memory, non-volatile memory, backup memory (e.g., programmable or flash memories), read-only memory (ROM), a hard disk drive (HDD), a solid state drive (SSD) or any combination thereof The ROM of the memory 1006 may be configured to store, amongst other things, an operating system of the device 1000 and/or one or more computer program codes of one or more computer programs. The RAM of the memory 1006 may be used by the processor 1008 for the temporary storage of data.

The description and drawings merely illustrate the principles of the present disclosure. It will thus be appreciated that those skilled in the art will be able to devise various arrangements that, although not explicitly described or shown herein, embody the principles of the present disclosure and are included within its spirit and scope.

Furthermore, all examples recited herein are principally intended expressly to be only for pedagogical purposes to aid the reader in understanding the principles of the present disclosure and the concepts contributed by the inventor(s) to furthering the art, and are to be construed as being without limitation to such specifically recited examples and conditions. Moreover, all statements herein reciting principles, aspects, and embodiments of the present disclosure, as well as specific examples thereof, are intended to encompass equivalents thereof.

What is claimed is:

1. A communication method, applied to a user equipment, the method comprising:

obtaining a first indication, wherein the first indication is used to indicate a first time position (T0), and the first time position (T0) is a starting point of an uplink transmission allocated by a base station;

obtaining a second indication, wherein the second indication is used to indicate a type of channel sensing corresponding to the uplink transmission;

obtaining a third indication, wherein the third indication is used to indicate a second time position (Ti) of the channel sensing, the second time position (Ti) is selected by the base station amongst multiple candidate time positions of the channel sensing;

performing the channel sensing during a channel sensing duration (D0) based on the second indication and the third indication, and initiating the uplink transmission after the channel sensing duration (D0), wherein an initiating point (T0-D1) of the uplink transmission is earlier than the starting point of the uplink transmission by a first time period (D1), and a second time period (D2) is further comprised between an end point (Ti+D0) of the channel sensing duration and the initiating point (T0-D1) of the uplink transmission;

wherein a fixed time spacing (ΔT) presents between two adjacent candidate time positions in the multiple candidate time positions, and the method further comprises: obtaining a number (m) of the multiple candidate time positions and the time spacing (ΔT); and wherein the second time period (D2) is filled according to a Cyclic Prefix mechanism.

2. The method as claimed in claim 1, wherein the second indication is used to indicate the channel sensing duration (D0).

3. A communication method, applied to a base station, the method comprising:

selecting a second time position (Ti) amongst multiple candidate time positions of channel sensing; and sending a first indication, a second indication, and s third indication to a user equipment, wherein the first indication is used to indicate a first time position (T0), the first time position (T0) is a starting point of an uplink transmission allocated by a base station, the second indication is used to indicate a type of the channel sensing corresponding to the uplink transmission, and the third indication is used to indicate the second time position (Ti) of the channel sensing;

wherein the second indication and the third indication are used to indicate the user equipment to perform the channel sensing during a channel sensing duration (D0), a second time period (D2) is further comprised between an end point (Ti+D0) of the channel sensing duration and an initiating point (T0-D1) of the uplink transmission, and the D1 is a first time period by which the initiating point (T0-D1) of the uplink transmission is earlier than the starting point of the uplink transmission, the initiating point (T0-D1) of the uplink transmission is initiated by the user equipment after the channel sensing duration (D0);

wherein a fixed time spacing (ΔT) presents between two adjacent candidate time positions in the multiple candidate time positions, and the method further comprises: sending a number (m) of the multiple candidate time positions and the time spacing (ΔT) ; and wherein the second time period (D2) is filled according to a Cyclic Prefix mechanism.

4. An apparatus comprising at least a processor, and a memory including a computer program code, wherein the memory and computer program code are configured to, with the processor, cause a device comprising the apparatus to perform one or more steps of the method as claimed in claim 1.

5. A user equipment comprising an apparatus as claimed in claim 4.

6. A non-transitory computer readable medium comprising program instructions stored thereon for causing a device to perform the steps of the method as claimed in claim 1.

7. A device comprising at least a processor, and a memory including a computer program code, wherein the memory and computer program code are configured to, with the processor, cause a device comprising the apparatus to perform one or more steps of the method as claimed in claim 3.

8. A non-transitory computer readable medium comprising program instructions stored thereon for causing a device to perform the steps of the method as claimed in claim 3.

9. The method as claimed in claim 3, wherein the second indication is used to indicate the channel sensing duration (D0).

* * * * *